United States Patent Office 3,357,706
Patented Dec. 12, 1967

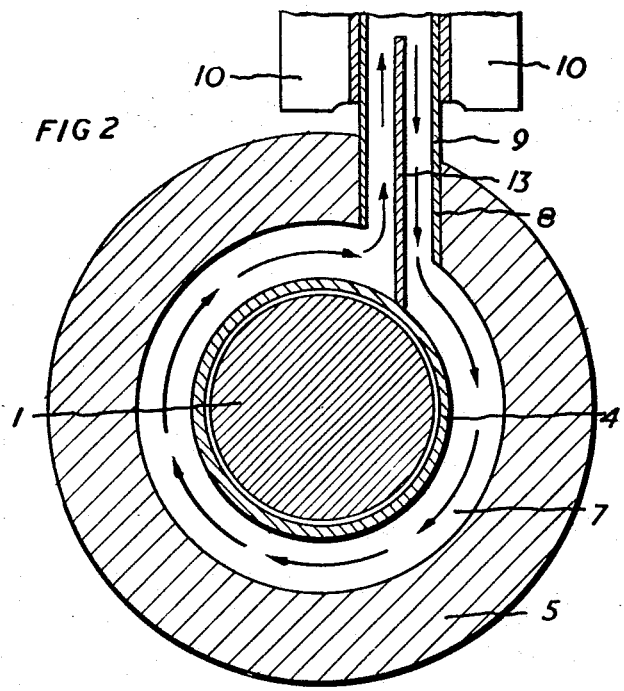
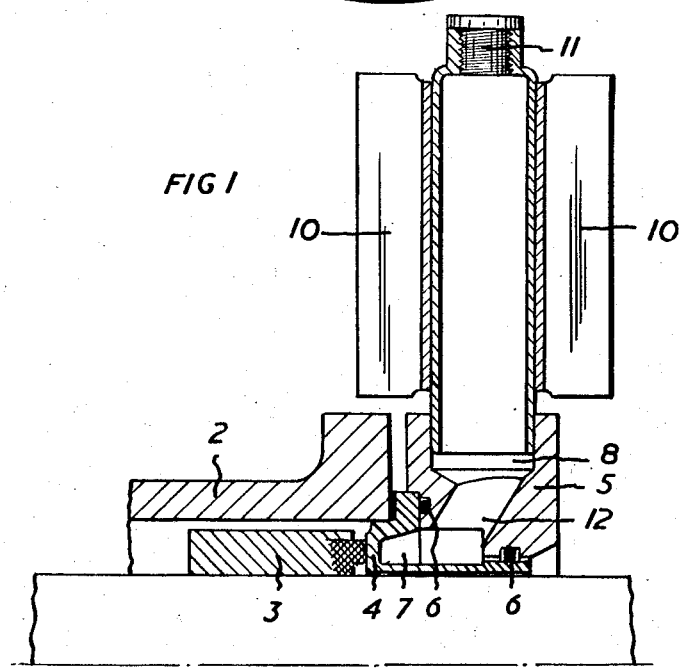

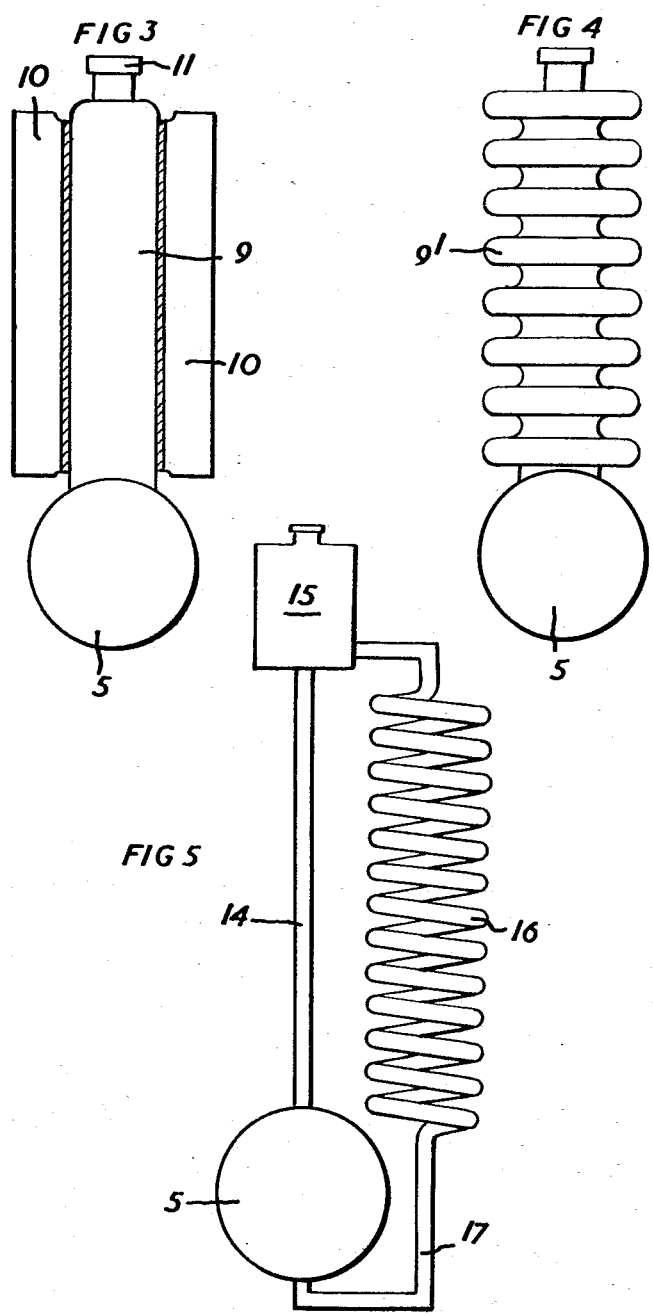

3,357,706
FACE SEAL WITH SELF-CONTAINED COOLING
Samuel Clifford Walter Wilkinson, Cookham, England, assignor to Crane Packing Limited, Slough, Buckinghamshire, England, a British company
Filed Jan. 7, 1965, Ser. No. 424,069
Claims priority, application Great Britain, Jan. 7, 1964, 652/64
4 Claims. (Cl. 277—15)

ABSTRACT OF THE DISCLOSURE

In a cooled rotary mechanical face seal the cooling circuit is a self-contained closed circuit transferring the heat from an annular groove in the back of the stationary seal face member to a heat-exchanger exposed to atmosphere without any external continuous fluid supply other than atmosphere. The heat-exchanger is preferably an upright generally cylindrical body extending upwards directly from the seal assembly and provided with fins or ridges. An internal wall divides its lower end into flow and return connections.

Detailed description

This invention relates to rotary mechanical seals, such as are used for sealing a rotating shaft into a housing, for example, into the casing of a pump. It is common practice to make the non-rotating seal face member or seat hollow and to circulate a cooling liquid through it in order to carry away the heat generated at the rubbing faces and thereby to keep the maximum temperature in the region of the seal down to the limit imposed by the characteristics of the materials used and by other factors. This technique is efficient but it has several drawbacks, the most important of which are, firstly, that it is expensive to provide a continuous flow of a cold liquid, even if it is only water, and secondly that, especially if raw water is used, there is a serious risk that scale or rust deposits within the hollow seat adjacent to its running face will reduce thermal conductiviy to a point at which the cooling is totally ineffective.

A further drawback of the known arrangements is that the circulation ceases when the shaft on which the seal is mounted stops rotating, and so the residual heat left in the seal at the moment of stopping is not carried away but can lead to overheating at this instant, especially if the seal is used on an installation carrying a hot fluid, the heat from which adds to the heat generated at the rubbing faces of the seal.

It is an aim of the present invention to overcome these and other drawbacks. According to the invention the non-rotating member or seat of a rotary mechanical seal is provided with a passage for cooling liquid and the passage is in communication with an external heat exchanger to form a closed system, and a heat-transfer liquid circulates between the passage and the heat exchanger substantially wholly by convection. We thus have a closed recirculatory cooling system which requires no continuous supply and involves no wastage. This not only overcomes the cost problem and the corrosion and deposition problem, but also allows one, if desired, to choose as the cooling liquid one with properties especially suited to the purpose of heat exchange.

The invention will now be further described by way of example with reference to the accompanying drawings, in which:

FIGURE 1 is a longitudinal section through the upper half of a face seal incorporating a preferred embodiment of the cooling arrangements according to the invention;

FIGURE 2 is a transverse section to a larger scale through the lower part of a slightly modified version of the structure of FIGURE 1;

FIGURE 3 shows diagrammatically an alternative embodiment;

FIGURE 4 shows a further variant; and

FIGURE 5 shows a still further variant.

Referring first to FIGURES 1 and 2, a shaft 1 rotating in a housing 2, for example the housing of a pump for liquids, is sealed by a mechanical face seal comprising a member 3 mounted on the shaft and a member 4 mounted in the housing. The face of the member 3 is urged axially into rubbing contact with the member 4 by a spring or springs in a well-known manner not illustrated here. The stationary member 4 is held in place by a detachable ring or flange 5, to which the member 4 is sealed by O-rings 6, the ring 5 being held against the housing 2 by studs, not shown, and thereby clamping the peripheral flange of the member 4 against the housing 2.

It will be seen that the stationary seal face member 4 has a deep annular recess or groove 7 in its rear face, forming an annular passage for a cooling liquid which will carry away the heat generated at the rubbing face that is in contact with the rotating member 3. The thickness of material between the rubbing face and the passage 7 is made as small as possible consistent with the requirements of strength and rigidity.

The passage 7 is complemented by an adjoining recess in the ring 5 to form a passage of substantial width. A bore 8 extends through the periphery of the ring at a position such that, in the assembled seal, and when viewed horizontally along the axis of the shaft 1, it extends vertically upwards. In the embodiments shown in FIGURES 1 and 2 this bore is not radial but is offset, so that it is tangential to a circle rather smaller than the diameter of the shaft 1. This bore receives the lower end of an upwardly tubular container 9 which is provided with heat-dissipating fins 10 and is closed at its upper end by a screwed plug 11.

In the embodiment shown in FIGURE 1 the bore 8 is joined to the passage 7 by a short inclined portion 12, but in the modified version shown in FIGURE 2 the bore 8 and also the lower end of the container 9 extend right through to the passage 7.

It will be understood that the passage 7, the bore 8 and the container 9 form a closed thermo-syphon cooling system to carry away and dissipate the heat generated at the rubbing face of the member 4, without the need for any circulating pumps or continuous supply of liquid. The liquid with which the system is filled is preferably a mixture of di-phenyl and di-phenyl ether such as that sold under the registered trademark "Dowtherm" or dichloro-di-fluoro-methane (sold under the registered trademark "Freon"). The circulation is by convection and, in the modified version shown in FIGURE 2, there is provided a vertical dividing wall 13 to separate the flow and return and ensure smooth circulation.

Instead of the vertically extending fins 10 lying in radial planes, shown in FIGURES 1 and 2, any other form of fins or heat-dissipating surfaces would be used, for example ring-like or helical fins. In some cases the plain cylindrical surface of the container 9 alone may be sufficient.

FIGURE 3 shows an embodiment with the same fins 10 as those of FIGURES 1 and 2 but the container 9 has its axis disposed radially with respect to the seal instead of offset. FIGURE 4 shows a version in which the wall of the container 9' itself is corrugated to increase the heat-dissipating surface.

FIGURE 5 shows a version in which there are separate inlet and outlet bores at the top and bottom of the ring 5. The upper bore leads via a pipe 14 to a reservoir 15 and thence to a helical cooling coil 16 and back to the lower bore by a pipe 17. As in the embodiments described earlier, the circulation is by convection and the system is a closed one.

In all the embodiments described, not only the heat generated by friction but also any other heat reaching the seat, for example from the pump or other housing in which the seal is mounted (where hot fluids are being handled), will likewise be carried away. In each case the heat generated in or otherwise reaching the very small area of the seat is dissipated to the atmosphere from the very large surface area of the heat exchanger.

In operation the unit becomes more effective as the generated heat increases because of the greater temperature difference between the heat exchanger and the atmosphere, and therefore a comparatively small unit is quite capable of maintaining satisfactory face temperature conditions which normally call for a fairly high limit, for example 80° C. in the case of a seal applied to a pump carrying superheat water in steam-generating plant.

Another advantage of the arrangements described, as compared with known cooling layouts for face seals, is that it withdraws the heat from only the vital point, namely, the rubbing faces of the seal face members and although it will also withdraw any heat reaching that point from elsewhere, for example from a hot liquid circulating the housing 2, it does not withdraw any additional heat from that liquid via other paths and so it does not cool down the liquid in the housing unnecessarily.

What I claim is:

1. In a rotary mechanical face seal assembly of the kind comprising relatively rotatable annular seal face members urged into mutual rubbing contact over radial faces thereof and associated respectively with a shaft and with a housing wall, provision being made for circulating a cooling fluid past the seal face members to remove heat generated at their rubbing faces, the improvement comprising an annular groove in that seal face member which is associated with the housing wall, said groove defining a passage isolated from the rubbing face of that member, and a heat-exchange container external to said housing wall and having a heat-dissipating external surface exposed directly to atmosphere and to no other external fluid, flow and return connections being provided between said heat-exchange container and said passage to define an independent closed fluid circuit, and a heat-exchange fluid circulating in said circuit.

2. In a rotary mechanical face seal assembly as set forth in claim 1, the further improvement which consists in said container being mounted directly on said housing wall and having an opening communicating with said passage, a dividing wall splitting said opening to define said flow and return connections.

3. In a rotary mechanical face seal assembly as set forth in claim 2 the further improvement which consists in the feature that, with the axis of the shaft horizontal, said container comprises a body of generally cylindrical shape extending vertically upwards from the region of said shaft.

4. In a rotary mechanical face seal assembly as set forth in claim 3 the further improvement which consists in said container having its axis offset laterally with respect to the axis of said shaft.

References Cited

UNITED STATES PATENTS

| 2,226,001 | 12/1940 | La Bour | 277—15 |
| 2,840,350 | 6/1958 | Pierce | 277—22 X |
| 3,015,506 | 1/1962 | Tracy | 277—22 X |

SAMUEL ROTHBERG, *Primary Examiner.*